July 21, 1959 — T. A. FJELLSTEDT — 2,896,012

BUS SUPPORT

Filed Sept. 22, 1955 — 4 Sheets-Sheet 1

INVENTOR.
THORSTEN A. FJELLSTEDT

BY Ralph G. Hohenfeldt

ATTORNEY

July 21, 1959

T. A. FJELLSTEDT 2,896,012

BUS SUPPORT

Filed Sept. 22, 1955

4 Sheets-Sheet 2

INVENTOR.
THORSTEN A. FJELLSTEDT
BY Ralph G. Hohenfeldt
ATTORNEY

INVENTOR.
THORSTEN A. FJELLSTEDT
BY Ralph G. Hohenfeldt
ATTORNEY

July 21, 1959 T. A. FJELLSTEDT 2,896,012

BUS SUPPORT

Filed Sept. 22, 1955 4 Sheets-Sheet 4

INVENTOR.
THORSTEN A. FJELLSTEDT

BY Ralph G. Hohenfeldt

ATTORNEY

United States Patent Office 2,896,012

Patented July 21, 1959

2,896,012

BUS SUPPORT

Thorsten A. Fjellstedt, Ingleside, Ill., assignor to McGraw-Edison Company, a corporation of Delaware Application September 22, 1955, Serial No. 535,844

5 Claims. (Cl. 174—171)

This invention pertains to improvements in electric bus bar supports.

An object of the invention is the provision of a bus support of simple, rugged design which will accommodate bus bars of various sizes and in various quantities.

Another object is to provide a bus bar support which may be easily aligned with other supports and the bus bars constituting the run.

Another object is to provide a bus bar support which permits the bus bars of a run to bear directly on its base and yet securely clamps the bars so that when strong magnetic forces occur, incident to the flow of heavy short circuit current in parallel lines or phases, the bars will not be deflected laterally nor will dangerous cantilever forces be developed which could overstress the porcelain insulators supporting the bus.

Accomplishment of these and other objects will be more evident from the specification taken in accompaniment with the drawing in which like parts are designated by like reference numerals:

Figures 3, 4, 4A:
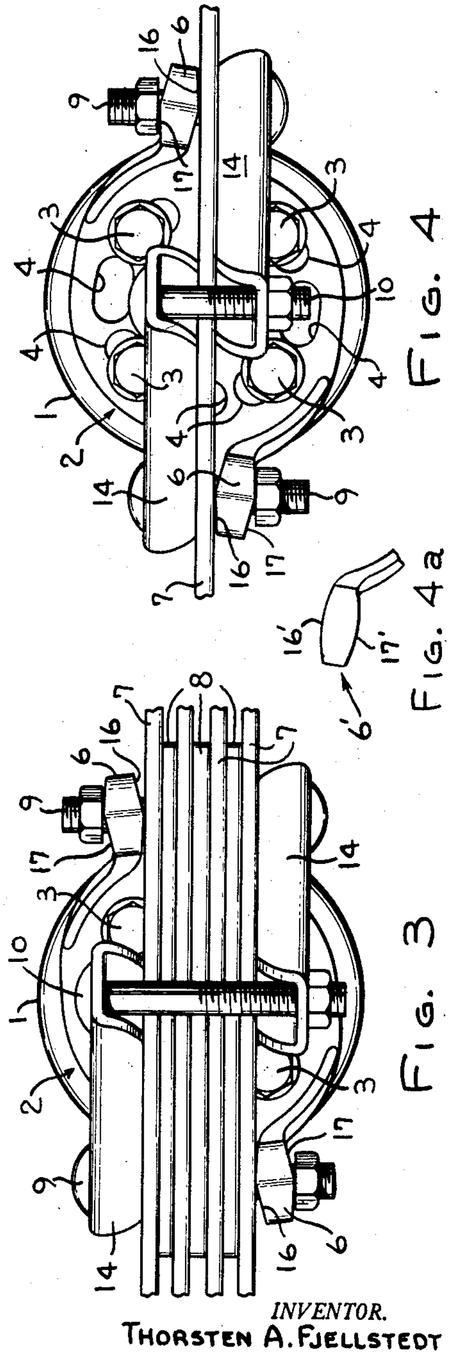
Fig. 3 is a plan view of the structure illustrated in the preceding figures.
Fig. 4 is similar to Fig. 3 except that only one bus bar is embraced.
Figure 5:
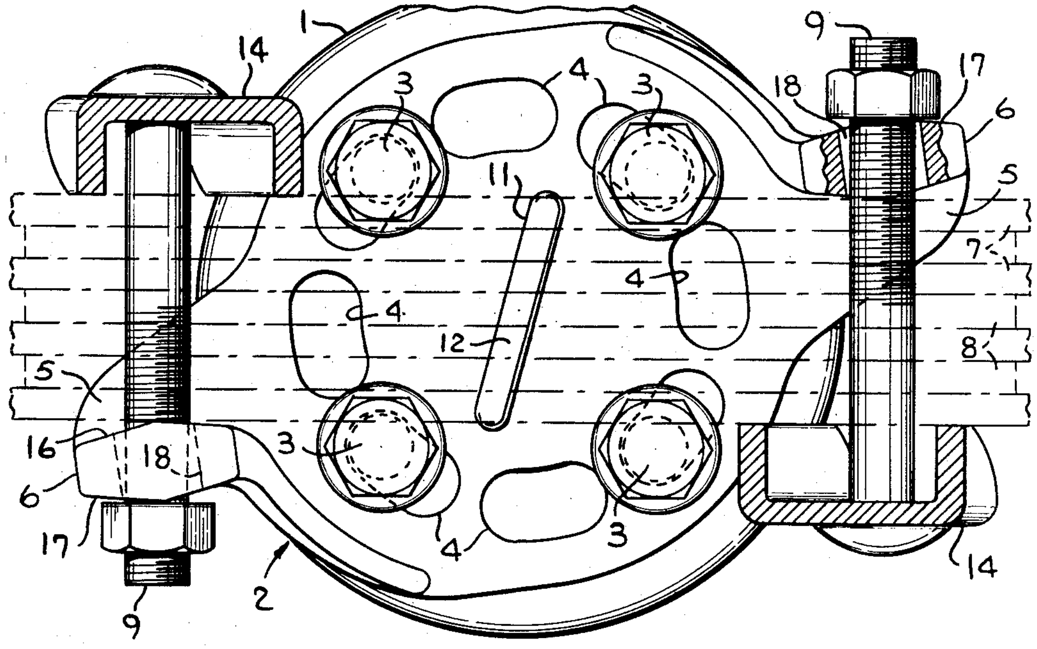
Figure 6:
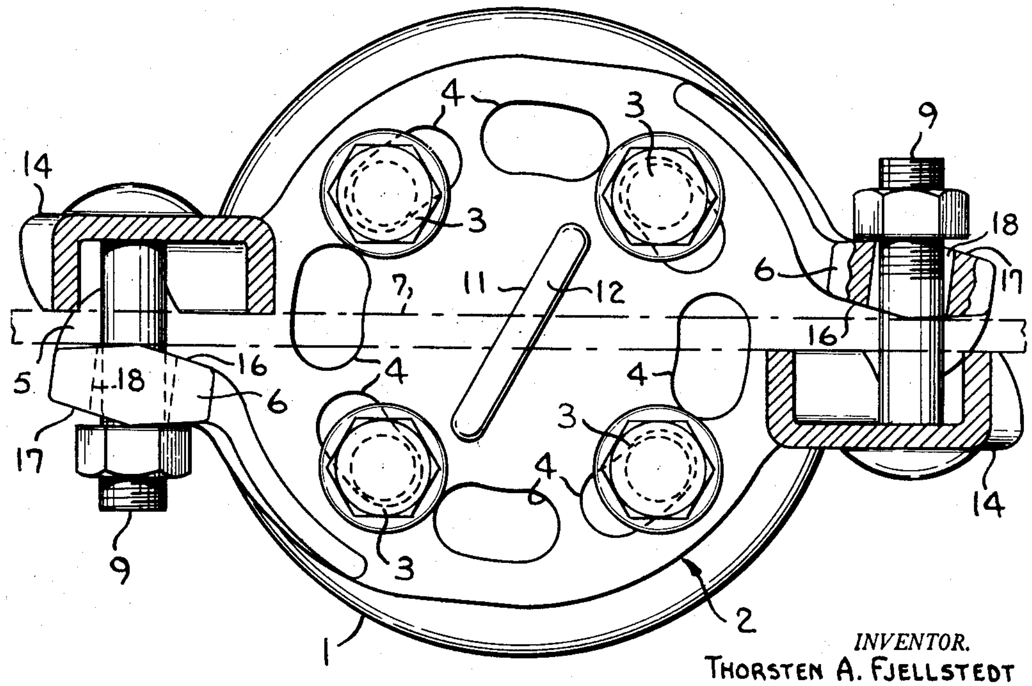
Figure 10:
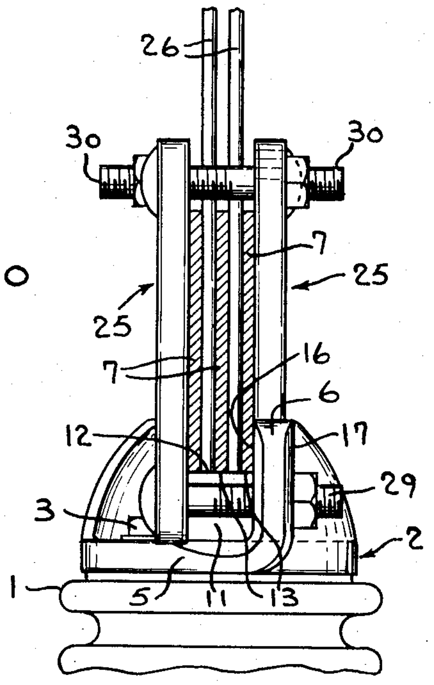
Figure 11:
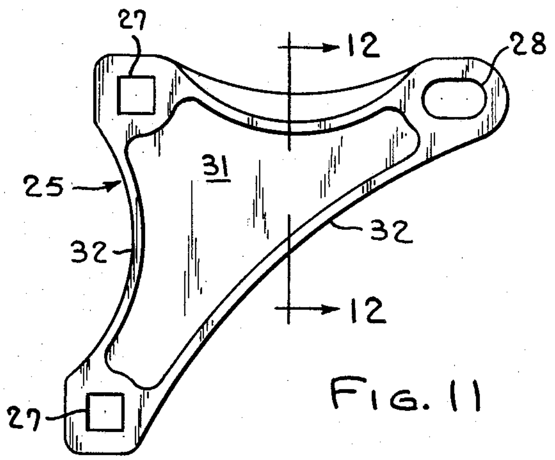
Figure 7:
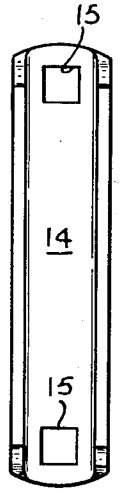
Figure 12:
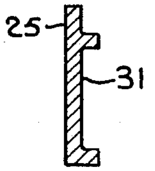
Figure 8:
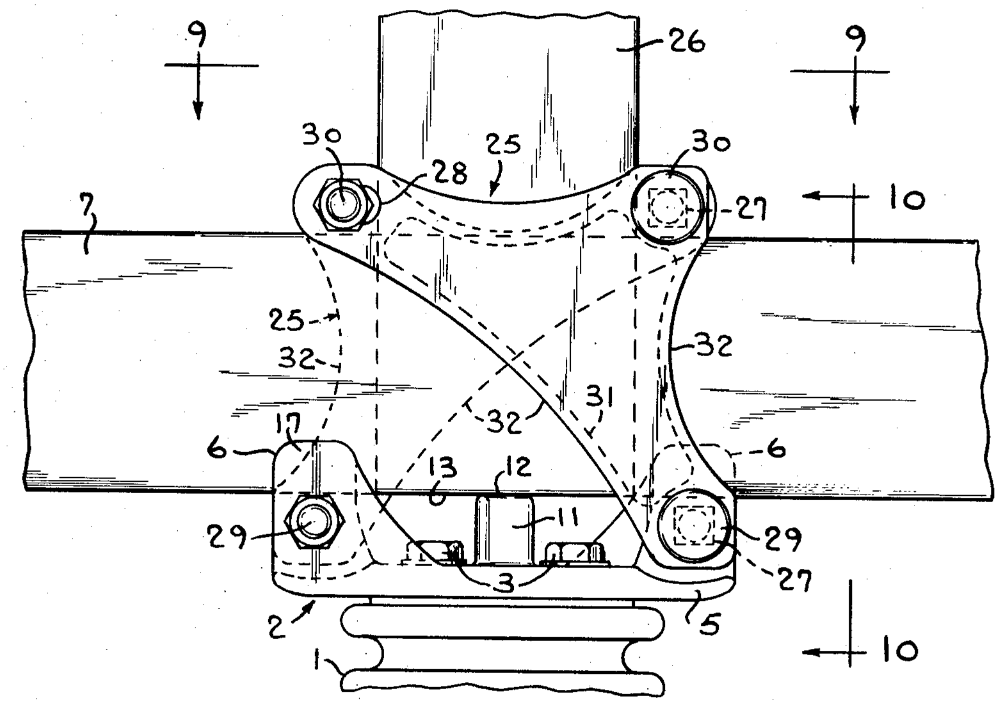
Figure 9:
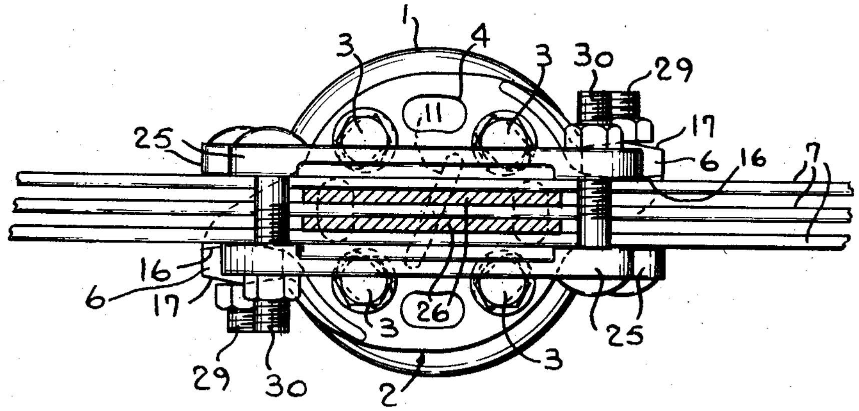

Fig. 4*a* is a detail section of a modified bus support leg element;

Figs. 5 and 6 illustrate the aspect of the invention represented in Figs. 3 and 4 respectively, showing the bus bars in phantom and with parts of the support in section;

Fig. 7 is a detail view of a bus clamp member such as that illustrated in the six previous figures;

Fig. 8 is a side elevation view of a variation of the invention;

Fig. 9 is a top view thereof, partly in section on a line corresponding with 9—9 of Fig. 8;

Fig. 10 is a section taken on a line corresponding with 10—10 of Fig. 8;

Fig. 11 is a detail of a bus clamp member such as illustrated in conjunction with the three previous figures; and, Fig. 12 is a section taken on a line corresponding with 12—12 of Fig. 11.

The novel bus support is illustrated in the drawing as being mounted on a conventional post type porcelain insulator 1. The base 2 of the bus support clamp is preferably a casting of either ferrous or nonferrous metal, the choice being dependent upon the amount of current which the bus is intended to carry and is further qualified by whether other elements of the clamp, to be described, are of magnetic or nonmagnetic character. It is recommended that where more than 3,000 amperes is being carried that all parts be of a nonferrous metal such as bronze. Below this current value, it is only necessary that certain of the elements be nonferrous so that the magnetic circuit about the support will be discontinuous.

In Figs. 5 and 6 particularly, it will be observed that the base 2 is adjustably fastened to insulator 1 by means of four cap screws 3 which thread into holes disposed about one of the standard size bolt circles to be found in commercially available bus clamp insulators. The base 2 is provided with a plurality of circumferentially spaced elongated slotted holes 4 for permitting fixing the base 2 in various angular positions about the axis of insulator 1.

Examining the top view of base casting 2 (see Fig. 6) it is particularly clear how opposite marginal peripheries thereof are provided with casting extensions 5 lying substantially in a horizontal plane and which terminate in upstanding bus support legs 6. With respect to a line coinciding with the general direction of the bus bar's 7 run, rotation of base 2 about the axis of insulator 1 causes a lateral separation of legs 6 to define a bus bar passageway therebetween. By comparing Figs. 5 and 6, it will be noted how the width of this passageway may be varied simply by loosening cap screws 3 and rotating the base 2 about the axis of insulator 1. Hence, in Fig. 5 four bus bars 7 and three spacers 8 are shown tightly embraced between legs 6. Whereas, in Fig. 6, base 2 has been rotated in a clockwise direction, thereby narrowing the passageway for properly receiving only a single bus bar 7. The only alteration required in the bus support itself is the changing of the length of carriage type clamping bolts 9 and 10.

Base casting 2 is provided at its central portion with a bus bar supporting post 11 of elongated configuration extending substantially transverse to the bus bar 7 run. When base 2 is rotated for increasing the width of the passageway between legs 6, elongated bearing post 11 approaches perpendicularity with bus bars 7 being supported. This attribute of the invention is particularly evident by comparing Figs. 6 and 5, respectively. Thus, as more bus bars 7 are to be accommodated, the post 11 presents a larger effective bearing surface 12 in the path of the parallel bars 7.

Figure 2:
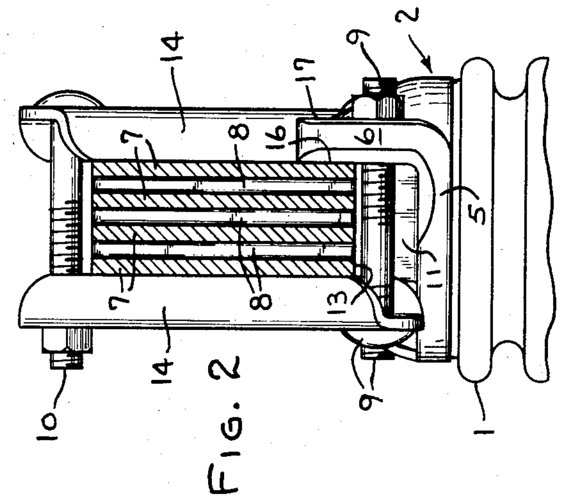
Fig. 2 is a section taken on a line corresponding to 2—2 of Fig. 1.
Figure 1:
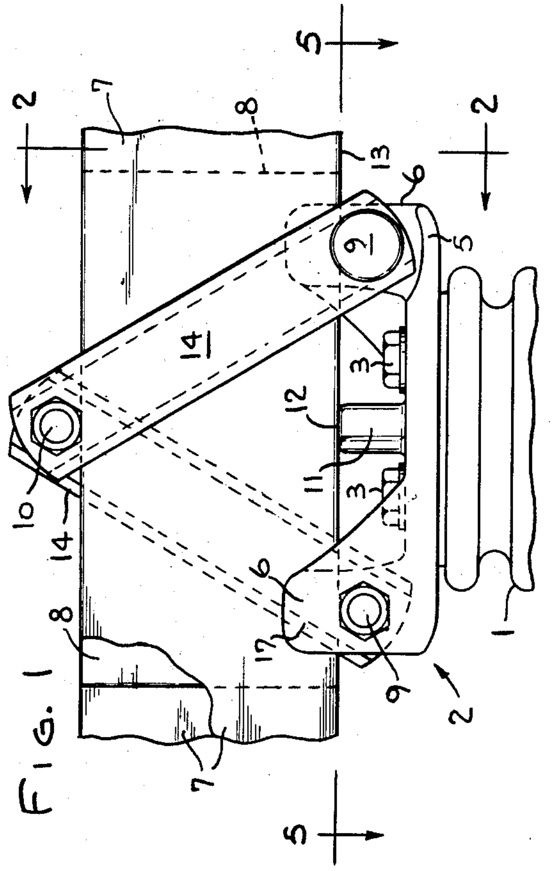
Fig. 1 is a side elevation view of the novel bus support shown supporting a group of spaced bus bars.

Figs. 1 through 3 illustrate how a plurality of bus bars 7 are supported on the novel bus support. It will be seen that the lower edges 13 of the bus bars bear directly upon centrally positioned bearing post 11. By this construction, the normal force incident to the weight of the bus bars is transmitted directly and centrally to the insulator 1, thereby reducing the tendency for development of lateral rocking stresses which might crack the porcelain insulators 1.

For securing and holding the bus bar 7 group in firm compressive relation between opposed upstanding legs 6 complementary channel bar clamps 14 are provided in the form of the invention illustrated by the first eight figures. Each end of clamp bars 14 is provided with a square perforation 15 (see Fig. 7) for the purpose of engaging the square shank of a carriage bolt. By using channel iron for clamping members 14 maximum stiffness is attained and a further convenience in manufacture results since bar stock of that configuration is usually available commercially. By tying together complementary channel clamp bars 14 by upper tie-bolt 10 a complete metallic circuit would be created about the perimeter of the bus bars 7 being supported. For that reason, as suggested hereinbefore, it may be advisable where more than 3,000 amperes are being carried, to make the channel shaped clamp bars of a nonmagnetic material such as bronze.

In Figs. 1 and 2 it will be observed that opposite remote outer surfaces of adjacent bus bars 7 comprising a group are engaged by the complementary channel clamps 14 over a considerable length of bars 7. Thus, although the metallic content of the channel clamps 14 is relatively small, the area over which the bus bars 7 is engaged is relatively large, it corresponding in length with the extreme lengthwise dimensions of the base 2.

Although in Fig. 1 the height of bus bar 7 corresponds with the distance between lower clamping bolts 9 and upper tie-bolt 10, it should be appreciated that the same bus support may be used to clamp bus bars having a lesser height, it being among the advantageous features of the novel bus support that it is capable of ready adaptation to various sizes and quantities of bus bars. Of course, where power demands increase over a period of time following installation, it may be desirable to increase the cross sectional area and accordingly the height of the bus bar installation. Under these circumstances, the same base 2 may be allowed to remain intact on insulator 1 and only longer channel clamps 14 need be substituted. Therefore, it is only necessary that a consumer stock one size of base 2 and a variety of clamp bars 14 in order to satisfy the requirements of almost any installation when flat bus bars are used.

It will be noted that the cross sectional configuration of upstanding legs 6 is such that the compression surface 16 of the legs bears against corresponding points on the face of the bus bars being supported, in substantially line contact. The outer vertical surface 17 of legs 6 is likewise formed by the intersection of two vertical planes so that the cross sectional configuration of the leg is that of two truncated triangles abutting at their bases. Thus, the nut on lower clamping bolts 9 is caused to bear against an adequate surface area on legs 6 regardless of whether one bus bar is being supported as in Fig. 4, or whether a group of bus bars are being accommodated by the bus support, as in Fig. 3.

An alternative cross sectional configuration for upstanding legs 6′ is represented in Fig. 4*a*. This leg is characterized by the smooth arcuate contour of its bus bar engaging surfaces 16′ so that it contacts the plane surfaces thereof with near perfect tangency regardless of the angular position of base 2.

Lower clamping bolts 9 necessarily pass through relatively large clearance holes 18 in each leg 6 (see Fig. 5 or 6). This feature does not impair the ruggedness of the bus support construction when lower clamping bolts 9 are tightened because of the bus bars 7 are supported on an integrally cast post 11 at their bottom edges 13 and against the integrally cast legs 6 on their side faces. These features impart greater rigidity to the structure and make the bus support particularly resistant to lateral deflection resulting from cantilever forces developed by magnetic interaction accompanying the flow of short circuit currents between the bus phases.

Attention is now directed to Fig. 8 and ensuing figures illustrating a use of the same base 2 in conjunction with a modified form of bus bar clamp 25 in an assembly where a T-connection is made by means of the novel support.

In Fig. 8 the horizontal bus bars are again supported in edgewise relation, but in place of spacers 8 of the previous figures there are substituted a pair of vertical bus bars 26 constituting the T-branch. Here the complementary clamping plates 25 are of substantially triangular configuration and each is provided with either a square 27 or an elongated 28 bolt hole at the apices thereof. This construction develops an electric contact bearing pressure between vertical 26 and horizontal 7 sections of the bus run.

Each clamping plate 25 is engaged at its lowermost apex by a pair of clamping bolts 29 passing through upstanding legs 6 and a pair of tie-bolts 30 interconnecting the complementary clamping plates on each side of the bus section forming the T-connection.

Fig. 11 shows a detail view of the modified clamp plates 25. Note that, in the preferred form, this plate is cast with a central recess portion 31 and that a marginal web 32 is allowed to remain for the purpose of augmenting the rigidity of the casting. Certain of the bolt holes 27 are square for engagement with the shank of a carriage bolt and the other hole 28 is elongated for free play with tie-bolts 30 so that when the assembly is made as in Fig. 8, tie-bolts 30 may be pushed toward each other until their peripheries contact the edges of the vertical bus bar 26, thereby tightly confining the vertical bus run between them.

In using the novel bus support, porcelain insulators 1 are firmly fastened in alignment on whatever structure, not shown, is available for that purpose. Lower clamping bolts 9 or 29 are then passed through complementary side clamps 14 or 25, respectively, and legs 6. A nut is placed on the bolts rather loosely. The base 2 is secured fairly firmly to the top of insulator 1 but it is allowed to remain loose enought to facilitate alignment with other supports after bus bars 7 are placed on the base. Clamp members 14 or 25 are then allowed to lie in parallel spaced relationship with each other in a horizontal plane on the side of base 2 and the bus bars are placed in edgewise position in the passageway defined by the spaced upstanding legs 6. This facilitates installing the bus bars 7 since the various bars have an inclination to stand upright by reason of the support which they obtain from legs 6 even though the clamps 14 or 25 not bolted firmly together by tie-bolts 10 or 30. After the bus bars 7 and spacers 8 are installed, in relation to each bus support, channel clamp bars 14 or 25 are swung upwardly, on lower bolts 9 or 29 as their pivot, and the ends are tied together over the bus bar by meas of the tie-bolts. Subsequent to tightening all of the nuts on the various bolts and assuring alignment of the bars, easily accessible hexagon bolt heads 3 are drawn down onto base 2, securing it firmly to insulator 1.

Exemplary embodiments of the novel bus support have been shown when the bus bars supported are on top of the base. However, it is possible to invert the insulators and support the base, by means of the novel support, in an underhung position if occasion demands. Also, if supporting the bars to allow for expansion or creepage, a tubular filler or spacer may be slipped over each of the clamping and tie-bolts so that the side clamps will be strongly urged toward each other but not in compression against the bus bars.

From the foregoing discussion it is apparent that a highly versatile bus support has been described which features convenient conversion from a single bus bar supporting device to one which supports a plurality of bars without requiring expensive substitution or modification of its components. Moreover, the bus support is seen to be of particularly rigid construction since opposed faces of adjacent bars are engaged by upstanding legs which are integrally cast with the base casting. It is further clear that electric utilities or others using the novel bus support need only stock a single size base for a plurality of installations and a number of different kinds of clamping bars to properly accommodate bus bars of varying widths and quantities.

While particular embodiments of the bus bar support have been shown it is apparent that the illustrations are only suggestive of means for carrying out the principles of the invention, and therefore, it is contemplated that the appended claims cover any such modifications as fall within the true spirit and scope of the invention.

It is claimed:

1. A bus bar support adjustable to embrace one or a plurality of bus bars by rotation on its axis, said support comprising a base member rotatable between first and second angular positions, means for releasably securing said base in any angular position between said first and second angular positions, said base member having a pair of upstanding legs extending integrally from the base generally in the direction of said rotational axis and disposed at substantially opposite sides of the margins of said base, each of said legs being a first predetermined distance from the opposite sides of a fixed plane containing said rotational axis when said base is in said first angular position, the sum of said distances constituting the width of a bus bar passageway between said legs, each of said legs being a different predetermined distance from said plane when said base is in a predetermined different angular position relative to said first angular position, so that the width of said bus bar passageway may be varied by rotating said base to change the angular position of said legs, each of said legs having bearing surfaces disposed toward said passageway for engaging the bus bars in compressive relation thereagainst, said surfaces being bowed outwardly toward said passageway, and means including a plurality of clamping members, one being disposed on the opposite side of said passageway from each of said legs, for urging the bus bars into compressive relation with said legs.

2. The bus bar support as set forth in claim 1 wherein the bearing surfaces on said legs are convex.

3. The bus bar support as set forth in Claim 1 wherein each said leg has an aperture therethrough and each said clamping member has an aperture therethrough in register with the aperture in the leg opposed thereto and also has a portion extending beyond the bus bars and including first bolt means extending across said passageway through the registering apertures in said legs and said members and second bolt means laterally spanning said passageway in spaced relation to said base for joining said portions of said clamping members extending beyond said bus bars.

4. A bus bar support axially rotatable to a first position for embracing one bus bar aligned in the general direction of a bus bar run, said support being rotatable to a second position for embracing additional bus bars in parallel alignment with the bar embraced when in the first position, said support comprising a base having spaced legs projecting integrally from the base from positions on substantially diagonally opposed margins thereof, the space between said legs constituting a bus bar passageway, said bus bar passageway maintaining its original general direction when said base is rotated between said first and second positions, opposed bus bar engaging surfaces formed on said legs and disposed toward the bus bar passageway, said surfaces being bowed outwardly toward said bus bar passageway so that the lateral margins of said passageway are defined by different portions of said surfaces when said base is in each of said first or second position, an elongated bearing post extending upwardly from said base and disposed laterally of said passageway bolt means projecting laterally through each leg across said passageway, and a clamping member on each side of the passageway, each said member having an aperture adjacent one end through which passes the bolt means that projects through a leg on the opposite side of the passageway, each clamping member being disposed lengthwise of the bus bar passageway in complementary parallelism with the other member, and tie-bolt means spanning said passageway laterally for joining the other ends of said clamping members remote from the base and for urging said members toward each other while compressing one or more bus bars therebetween.

5. A bus bar support comprising, a base member rotatable about an axis between first and second angular positions, a pair of legs integral with said base and spaced from each other along a bus bar passageway defined thereby and laterally on opposite sides thereof each of said legs being disposed a first predetermined distance from a plane containing said axis when said base is in its first angular position, the sum of said distances defining the width of said bus bar passageway, each of said legs being a different predetermined distance from said plane when said base is rotated to a different angular position so that the width of said bus bar passageway may be varied by rotating said base portion, bolt means extending through each leg substantially normal to said passageway, a bearing post on said base intermediate said legs and disposed substantially transversely to said bus bar passageway and terminating in a plane remote from said base, clamping members each having an aperture adjacent one end through which passes the said bolt means that projects through a leg on the opposite side of the passageway and each clamping member being spaced laterally from an opposite leg in complementary opposed relation to the other for engaging a bus bar therebetween, each said clamping member being disposed lengthwise of the bus bar passageway and in parallelism with the other member, and tie-bolt means spanning said passageway laterally for joining the other ends of said clamping members remote from the base and urging them toward each other.

References Cited in the file of this patent

UNITED STATES PATENTS

| | | |
|---|---|---|
| 1,781,145 | Williams | Nov. 11, 1930 |
| 1,876,584 | Austin | Sept. 13, 1932 |
| 2,415,649 | Matthysse | Feb. 11, 1947 |
| 2,616,646 | Matthysse | Nov. 4, 1952 |

FOREIGN PATENTS

| | | |
|---|---|---|
| 776,394 | France | Jan. 24, 1935 |